United States Patent [19]

Kerfoot, Jr.

[11] Patent Number: 5,390,796
[45] Date of Patent: Feb. 21, 1995

[54] ENVELOPE APPARATUS FOR DISPENSING MEDICATIONS FROM DRUG FILES

[76] Inventor: Franklin W. Kerfoot, Jr., 678 Andover Rd., Newtown Square, Pa. 19073

[21] Appl. No.: 160,178

[22] Filed: Dec. 2, 1993

Related U.S. Application Data

[63] Continuation-in-part of Ser. No. 959,015, Oct. 2, 1992, abandoned.

[51] Int. Cl.⁶ ............................................. B65D 85/56
[52] U.S. Cl. .................................... 206/534; 206/538; 383/106
[58] Field of Search .................... 206/459.5, 461, 466, 206/477, 484, 528, 534, 540, 538; 229/68, 247; 383/39, 106

[56] References Cited

U.S. PATENT DOCUMENTS

| | | | |
|---|---|---|---|
| 2,536,773 | 1/1951 | Saidel | 383/95 |
| 3,278,109 | 10/1966 | Salway | 206/484 |
| 3,507,444 | 4/1970 | Werby | 229/68 |
| 3,942,640 | 3/1976 | Hellstrom | 206/470 |
| 4,119,203 | 10/1978 | Kuchenbecker | 206/467 |
| 4,509,196 | 4/1985 | Sak et al. | 206/438 |
| 4,660,721 | 4/1987 | Mykleby | 206/438 |
| 4,733,362 | 3/1988 | Haraguichi . | |
| 4,860,899 | 8/1989 | McKee | 383/84 |
| 4,890,744 | 1/1990 | Lane, Jr. et al. | 206/484 |
| 5,064,071 | 11/1991 | Kerfoot, Jr. | 206/534 |
| 5,172,854 | 12/1992 | Weinstein | 229/247 |

*Primary Examiner*—Jimmy G. Foster
*Attorney, Agent, or Firm*—Dann, Dorfman, Herrell and Skillman

[57] ABSTRACT

A dispensing-envelope apparatus consisting of a transparent and hermetically closed drug pocket for small medications or drugs mounted on the front side and lower half of the apparatus. The envelope is designed to pass through a computer-output printer for the reception of printed information or data on the front side and upper half of the apparatus. The printed information is located in an area above the pocket and includes file index information located on the top printed line of the apparatus. The top side of the pocket is closed by a semi-permanent closure with means for easy opening and for reclosing by humans or by machine. When open, the pocket may be filled with drugs by gravity. The drugs in the pocket are dispensed to a patient in accordance with the information provided on the apparatus.

11 Claims, 6 Drawing Sheets

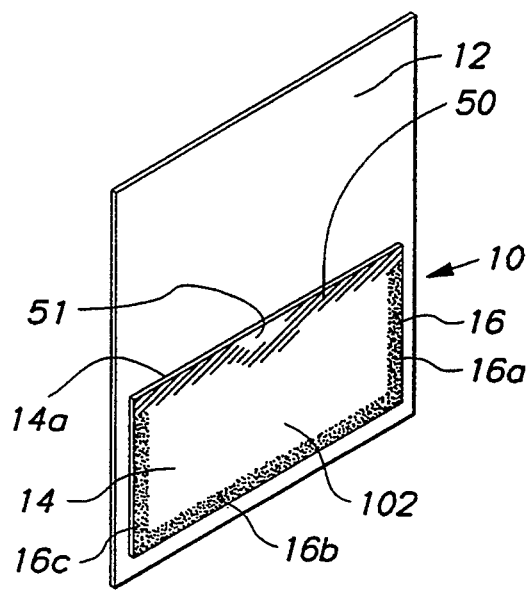
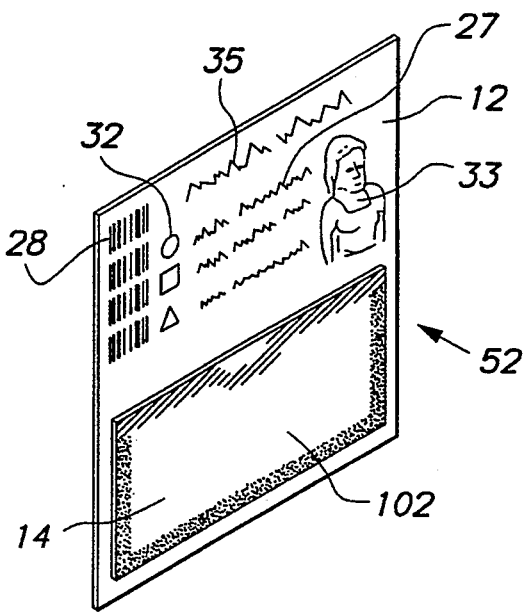
FIG. 1
FIG. 2
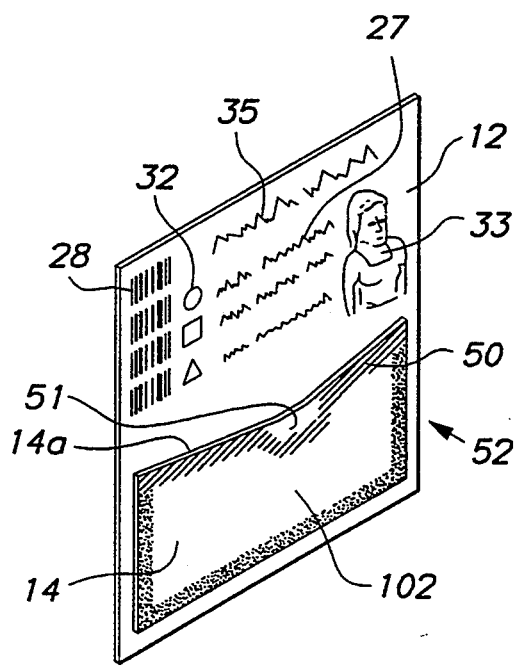
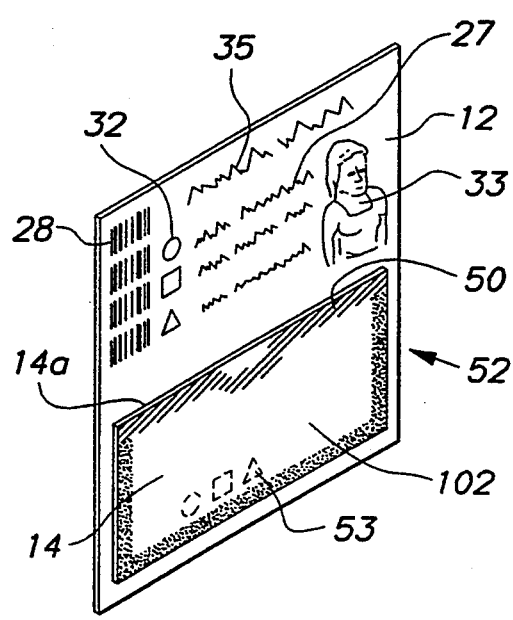
FIG. 3
FIG. 4

ENVELOPE APPARATUS FOR DISPENSING MEDICATIONS FROM DRUG FILES

REFERENCE TO RELATED APPLICATIONS

This is a continuation-in-part application of Ser. No. 07/959,015, filed Oct. 2, 1992, now abandoned.

BACKGROUND OF THE INVENTION

This invention pertains to a hermetic-sealed file-indexed dispensing envelope for medications or drugs to be filled in a pharmacy, and for transfer to an area with patients, where the envelope is used in the dispensing of the drugs to patients. The envelope also acts as an aid in the process of computer-charting of drug administration records and replaces the time-consuming manual charting. The use of the envelope results in reduction of medication errors, both in the pharmacy where the envelopes are filled and on the nursing floor where the drugs are administered to patients.

Prior Art U.S. Pat. No. 5,064,071 (Kerfoot) describes a drug container with an open-top pocket. This open-top pocketed drug container does not satisfy a need for a completely closed pocket which can store bare pills and capsules.

U.S. Pat. No. 4,860,899 (McKee) describes an envelope with a medication pocket which is side-opening when printed data is oriented for human readability; this makes the envelope difficult to fill with drugs while reading instructions from the printed matter. McKee does not meet a need for a gravity-fill top-opening transparent medication pocket combined with printed information oriented for human readability. McKee uses a pressure-sensitive adhesive for closing a medication pocket; however, no means are provided for opening the medication pocket. The patentee specifies a zip-lock type opening but provides no means of opening the zip-lock; therefore, this device does not include a semi-permanent closure for his transparent medication pocket with a means for reopening.

Haraguchi, U.S. Pat. No. 4,733,362 shows a drug dispensing apparatus arranged to form divided separate packets with computer-output printed matter on the front side. The patentee does not provide a transparent pocket on his front side.

Zip-lock utility bags, as sold in food stores, have a top opening semi-permanent closure; however, they require a loose flap above the semi-permanent closure in order to open the bag. This loose flap precludes a capability of passing the bag upward through a computer-output printer.

SUMMARY OF THE INVENTION

The medication dispensing-envelope apparatus disclosed consists essentially of two or more sheets of thin flexible material, bonded together to form a rectangular apparatus. It is capable of being fed through a computer-output printer and of receiving printed information on a front side. The apparatus includes a transparent closed upward-opening pocket relative to gravity and formed upon the front lower half of the apparatus. The front upper half of the apparatus is suitable for receiving printed data from a computer-output printer in an area above the upward-opening pocket. The data is positioned and oriented above the pocket for human reading when the pocket-opening is oriented upward. This allows easy gravity filling of the pocket while reading information or instructions from the printed data. The data includes file index information along the top side of the apparatus and making the apparatus into a self-indexed document when placed in certain types of files.

The transparent pocket is formed on the front side of the apparatus by permanent attachment of pocket material on bottom, right and left sides, and by a semi-permanent attachment along the top side. The semi-permanent attachment along the top side of the pocket, when the pocket is closed and empty, allows the apparatus to pass through a computer printer. The semi-permanent closure provides means for opening the top side of the pocket. Opening of the pocket along the top side allows machine-filling or manual filling of the pocket by gravity with pills, capsules, or other small medications or drugs. Reclosing and resealing the pocket after the entrance of drugs allows protection of pills and capsules against contamination until the pocket is opened for dispensing to a patient. The arrangement of the printed data and the medications in the transparent pocket on the front of the apparatus allow the reading of the data and the viewing of medications through the transparent pocket simultaneously as a check on the accuracy of filling.

The data includes two fields of printed computer-output data, a first field including file index information located at the top of the apparatus and a second field located below the first field; both fields include printed data and graphics. The printed data may describe pertinent information required for identification of the medications, for identification of the patient and for dispensing of the correct medication to the correct patient at the correct time.

BRIEF DESCRIPTION OF THE DRAWINGS

FIG. 1 is an isometric view of a medication dispensing envelope in accordance with the principles set forth in this invention.

FIG. 2 is a view after the medication dispensing envelope has received printed data from a computer-output printer.

FIG. 3 is a view after the medication dispensing envelope pocket has been opened along the top side to allow entrance of drugs.

FIG. 4 is a view of the medication dispensing envelope after drugs have been put into the pocket and after the top side has been reclosed.

DETAILED DESCRIPTION OF THE PREFERRED EMBODIMENT

Figure 5:
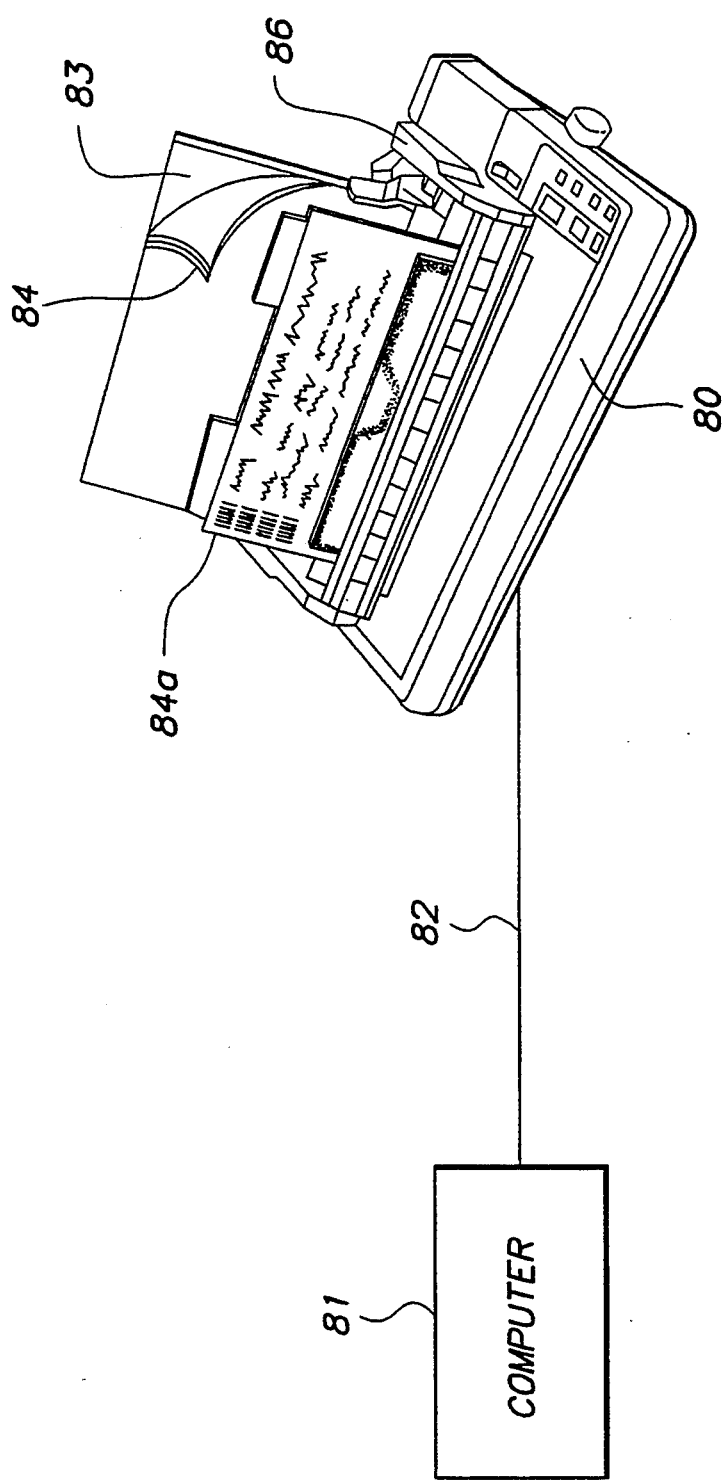
FIG. 5 shows a medication dispensing envelope located in the printer.

Referring to FIG. 1, there is shown the dispensing-envelope apparatus 10 for holding small items such as medications or doses of drugs. The apparatus 10 essentially consists of a transparent or semi-transparent sheet 14 of 0.0004 to 0.001 inch thick plastic film or the like positioned upon a 0.003 to 0.005 inch thick opaque backing sheet 12 which is suitable for receiving a variety of computer printing. The plastic sheet 14 is attached to the backing sheet 12 by a suitable permanent bonding material 16 on three sides, right side 16a, bottom side 16b, and left side 16c, which form an upward-opening pocket 102 suitable for the above stated small items. Pocket 102 is formed along the lower 30–60% of the height of the backing sheet 12 and on the front side of the apparatus and is closed on the top side by a semi-permanent bonding material 50 such as pressure-sensitive glue. The bonding material 50, along the top side of the pocket 102, is indented downward at one location to form a finger-entry opening 51. This finger-entry opening 51 may be used to insert either a human finger or a mechanically-operated finger between the top edge 14a of sheet 14 and backing sheet 12 to allow opening of the top side of sheet 14 to form an open pocket 102 and to allow the pocket 102 to receive drugs by gravity. The width of the finger-entry opening 51 is made small relative to the width of bonding material 50 in order to prevent the top edge 14a, in the area of the finger-entry opening 51, from separating sufficiently from the backing sheet 12 to cause problems during the feeding of the apparatus 10 through a computer printer. Pocket 102 is shown closed and empty as occurs after manufacture. The envelope 10, when the pocket 102 is empty of drugs and closed, can readily pass upward through a computer-output printer and be printed in a normal orientation relative to gravity for reading by humans.

FIG. 2 shows apparatus 52 after printed information, data, or matter 27 and 35 has been added to a front surface by the printer. The printed matter 27 and 35 is located directly above pocket 102, on the front side of the apparatus and is oriented for human reading. This location and orientation of the printed matter 27 and 35 when combined with the use of the top-opening gravity-filled pocket 102 simplifies the filling of the envelope according to instructions in the printed matter, and also facilitates the checking of contents of the transparent pocket 102, after filling. Various types of printed data are shown and include text 27 and 35, graphics 32 and 33, and bar code 28. The data may include anything printable on a computer-output printer including color; in addition, the data may also include pre-printed matter that is placed upon the container during manufacture of the article.

Figure 16:
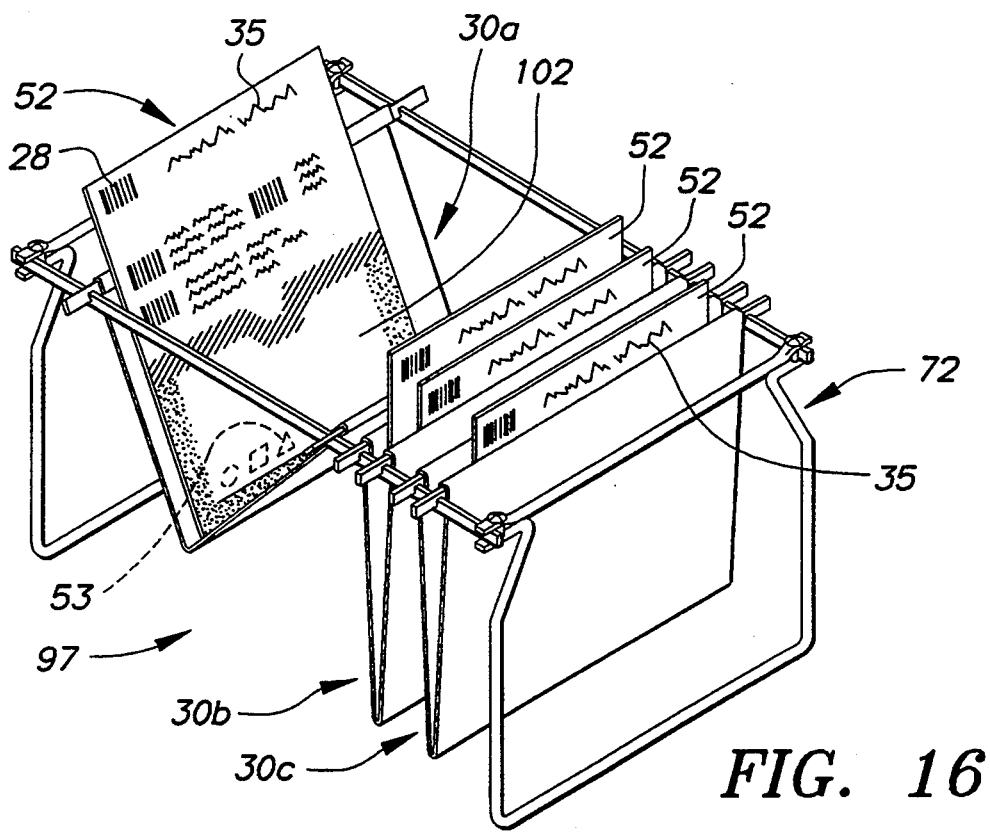
FIG. 16 is an isometric view of the dispensing-envelope apparatus as used with a file member.
Figure 17:
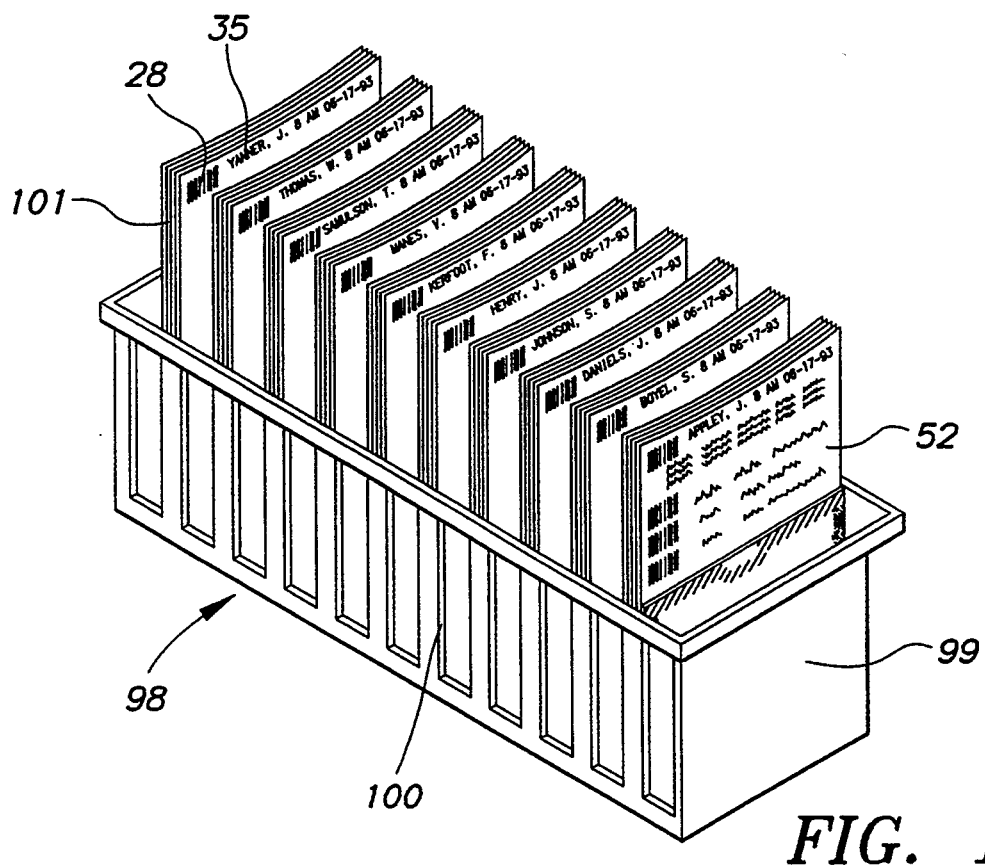
FIG. 17 is an isometric view of the dispensing-envelope apparatus as filed in a tray.

The printed information on the apparatus 52 includes two fields of computer-output data where the first field includes file index data 28 and 35 which is located at the top of the apparatus within 0.6 inch of the top edge, and a second field located below the first field, and including data and graphics 27, 32, and 33. The file index data 28 and 35 in the first field allow the apparatus 52 to be self-indexing when placed in a file as shown in FIGS. 16 and 17. FIG. 2 shows drug pocket 102 between sheets 14 and 12 as closed and empty.

FIG. 3 depicts apparatus 52 with pocket 102 opened for the receipt of drugs. The top edge 14a is pulled forward at indentation 51 relative to backing sheet 12 to allow entry of drugs. The separation of the top edge 14a from backing sheet 12 leaves pressure-sensitive glue 50 attached to the top side of sheet 14 for re-sealing purposes.

Apparatus 52 in FIG. 4 illustrates the pocket 102 closed after entry of drugs 53 into pocket 102. Pressure sensitive glue 50 allows the semi-permanent bond between sheet 14 and backing sheet 12 to re-close pocket 102.

Referring now to FIG. 5, there is illustrated the combination of a dispensing-envelope apparatus 84 positioned upon the carriage 86 of a computer printer 80. The envelope 84 is removed from a stack 83 in a serial manner to print computer-specified information relating to the patient and drugs upon envelope 84a. As understood, the printer 80 is connected via a connecting link 82 to the output terminal of a computer 81.

Figure 6:
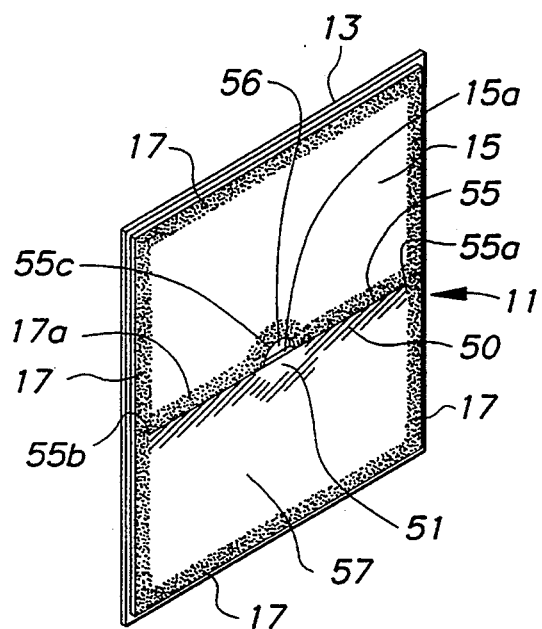
FIG. 6 is an isometric view of another embodiment of a medication dispensing envelope in accordance with the invention.

Another embodiment is depicted in FIG. 6 of a dispensing-envelope apparatus 11 for holding small items such as doses of drugs. The apparatus 11 essentially consists of a transparent or semi-transparent sheet 15 of 0.001 to 0.002 inch thick film or the like positioned upon a 0.003 to 0.005 inch thick opaque backing sheet 13. Transparent sheet 15 is suitable for receiving a variety of computer-output printing and is attached to the backing sheet 13 by a suitable permanent bonding material 17 on all four sides and by a band 17a across from left side to right side. A slit 55 is cut through transparent sheet 15, extending from 55a to 55b and provides a semicircular opening 56 in the central area. Slit 55 is located below permanent bonding material band 17a and provides an opening below band 17a to form a pocket 57 suitable for the above stated small items. The pocket 57 is formed between transparent sheet 15 and backing sheet 13 along the lower 30–90% of the height of the backing sheet 13. The pocket 57 is closed on the top side by a semi-permanent bonding material 50 such as pressure-sensitive glue. The bonding material 50 along the top side of the pocket is indented downward at one place to form a finger-entry opening 51. This finger-entry opening 51 may be used to insert either a human finger or a mechanically-operated finger between the top edge 15a of sheet 15 and backing sheet 13 to allow opening of the top side of pocket 57 to form an open pocket and to allow receipt or exit of drugs. The top side of pocket 57 is closed in FIG. 6 as after manufacture. The apparatus 11 with the pocket 57 empty of drugs and closed as shown in FIG. 6 can readily pass through the printer 80 since the transparent sheet 15 equalizes the thickness dimension of the lower half which includes the pocket.

Figure 7:
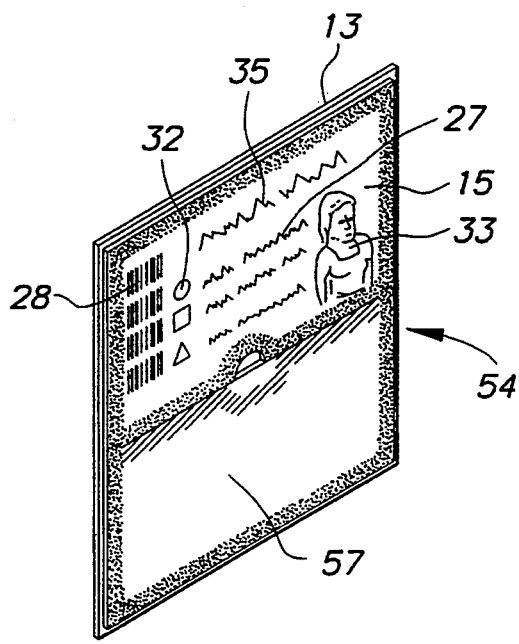
FIG. 7 is a view of the embodiment of FIG. 6 that has information printed upon the upper half by a computer-output printer.

Drug-dispensing apparatus 54 after printed matter has been added by printer 80 is illustrated in FIG. 7.

Various types of printed data are shown and include text 27 and 35, graphics 32 and 33, and bar code 28. The data may include anything printable on the printer 80 including color; in addition, it may also include preprinted matter that is placed upon the container during manufacture of the article. The computer-output data on the apparatus 54 includes two fields of printed computer-output data, a first field including file index data 28 and 35 and is located at the top of the document within 0.6 inch of the top edge, and a second field located below the first field, and including printed data and graphics 27, 32, and 33. The file index data 28 and 35 in the first field allow the drug apparatus 54 to be self-indexing when placed in a file folder that is 0.6 inch to 1.0 inch less in height than apparatus 54. FIG. 7 shows drug pocket 57 closed and empty.

Figure 8:
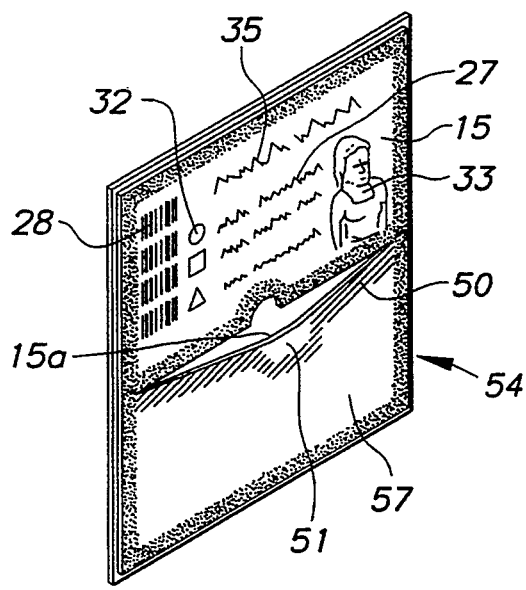
FIG. 8 is a view after the embodiment of FIG. 6 has been opened along the top side to allow the entrance of drugs.
Figure 9:
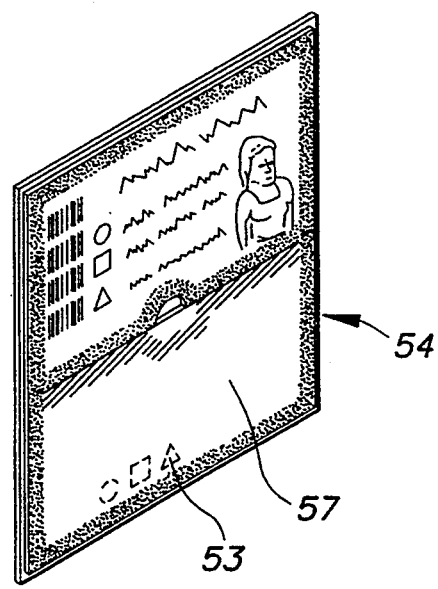
FIG. 9 is view after the embodiment of FIG. 6 after drugs have been put into the pocket and after the top side has been reclosed.

Drug-dispensing apparatus 54 is shown in an open position in FIG. 8 for the receipt of drugs. The top edge 15a of pocket 57 has been pulled forward at indentation 51 relative to backing sheet 13 to allow entry of drugs while leaving pressure-sensitive glue 50 attached to the inside of the top edge of pocket 57 in transparent sheet 15. In FIG. 9, container 54 is illustrated as being closed after entry of drugs 53 into the pocket 57. Pressure sensitive glue 50 has re-established a semi-permanent bond between transparent sheet 15 and backing sheet 13 thus closing the pocket 57.

Figure 10:
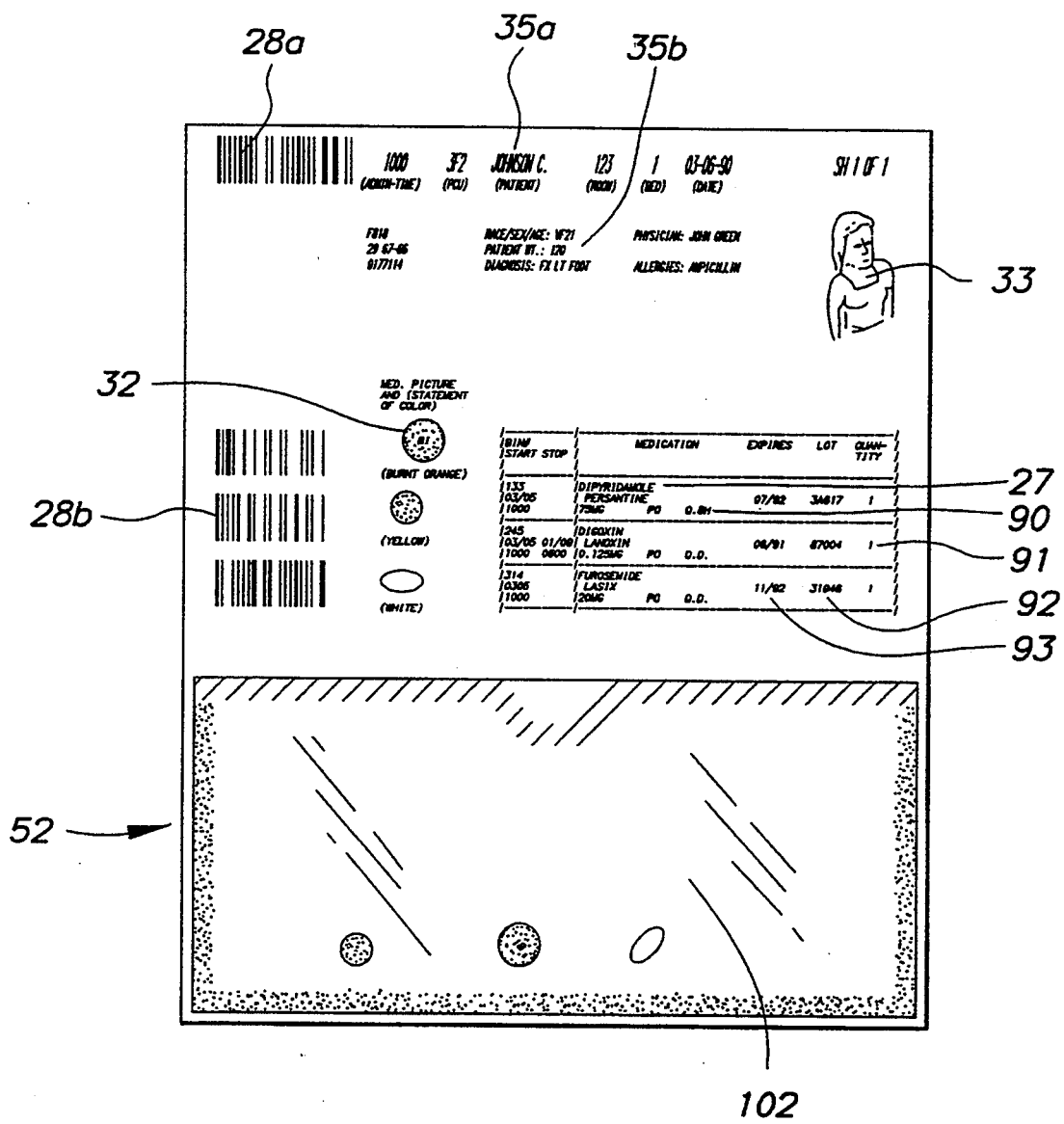
FIG. 10 is a front view of the embodiment of FIG. 2 showing the positioning of the printed matter.

Referencing FIG. 10, there is shown a dispensing envelope 52 and the positioning of printed matter in two fields. A first field includes file index information 28a and 35a, located in the top line of printed matter. The first field falls within an area bounded by the top edge of the apparatus and a line that is 0.6 inches below the top edge and parallel to the top edge. The second field is below the first field and may include patient data 35b and 33, drug data 27, 32, 28b, drug administration orders 90, drug quantity 91, drug lot number 92, drug expiration date 93, and other computer-output data.

Figure 11:
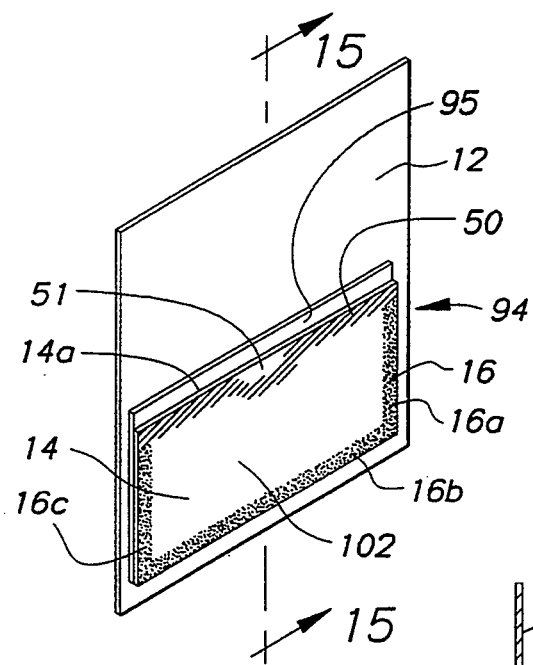
FIG. 11 is an isometric view another embodiment of a medication dispensing-envelope apparatus in accordance with the invention.
Figure 15:
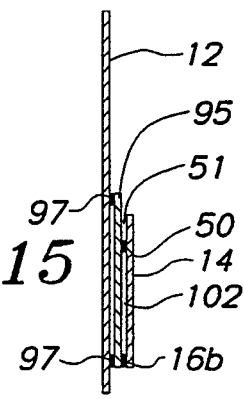
FIG. 15 is a cross-sectional view of FIG. 11 taken along line 15—15.

In FIG. 11, there is shown a third embodiment of the dispensing-envelope apparatus 94 for holding small items such as medications or doses of drugs. The apparatus 94 essentially consists of a transparent or semi-transparent sheet 14 of 0.0004 to 0.0006 inch thick plastic film or the like positioned on a flexible sheet 95 of 0.0004 to 0.0006 inch plastic film or the like and forming a pocket 102. Sheet 95 is the same width as sheet 14 and has a height 10% larger than sheet 14. Sheet 95 is positioned upon a 0.003 to 0.005 inch thick opaque backing sheet 12 which is suitable for receiving a variety of computer-output printing. In FIGS. 11 and 15, sheet 95 has a height that is 40 to 60% of the height of sheet 12, and a width equal to or less than the width of sheet 12. Sheet 95 is permanently attached by bonding material 97 to sheet 12 on all sides, and is located on the lower 40 to 60% of the height of sheet 12. Transparent sheet 14 is attached to sheet 95 by a suitable permanent bonding material 16 on three sides, right sides 16a, bottom side 16b, and left side 16c, these sides being relative to gravity, which is considered to be downward; these form an upward-opening pocket 102 suitable for the above-stated small items. Pocket 102 is formed along the lower 30–60% of the height of the backing sheet 12. Pocket 102 is closed on the top side by a semi-permanent bonding material 50 such as pressure-sensitive glue. The bonding material 50, along the top side of the pocket, is indented downward at one place to form a finger-entry opening 51. This finger-entry opening 51 may be used to insert either a human finger or a mechanically operated finger between the top edge 14a of sheet 14 and backing sheet 12 to allow opening of the top side of sheet 14 to form top-opening pocket 102 and to allow pocket 102 to receive drugs by gravity. The width of the finger-entry opening 51 is made small relative to the width of bonding material 50 in order to prevent the top edge 14a, in the area of the finger-entry opening 51, from separating sufficiently from sheet 95 to cause problems during the feeding of the envelope 94 through a computer-output printer when the pocket 102 is empty of drugs and closed, the envelope 94 can readily pass upward through a computer-output printer and be printed in an orientation relative to gravity which is normal for reading by human beings.

Figure 12:
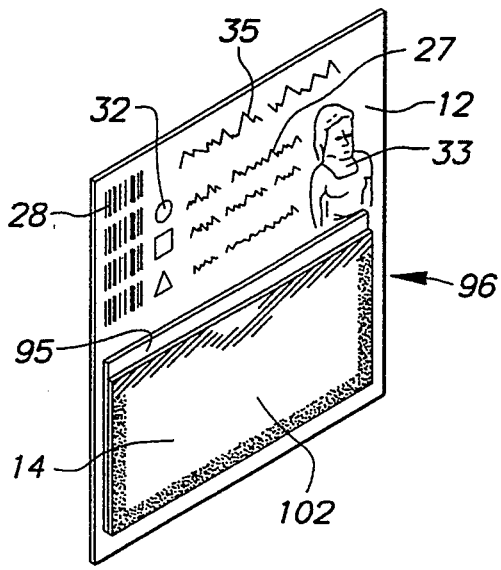
FIG. 12 is a view of the embodiment of FIG. 11 that has information printed on the upper half by a computer-output printer.

Apparatus 96 in FIG. 12 depicts printed matter added on a front surface by a computer printer. The location and arrangement of the printed matter are the same as for apparatus 52, previously described in FIG. 2.

Figure 13:
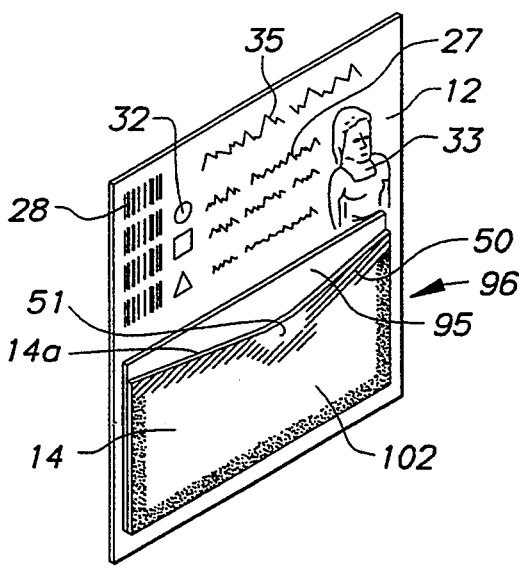
FIG. 13 is a view of the embodiment of FIG. 11 after the top side of the pocket has been opened to allow entrance of medications.

In FIG. 13, there is shown apparatus 96 opened for the receipt of drugs. The top edge 14a has been pulled forward at indentation 51 relative to sheet 95 to allow entry of drugs. The separation of top edge 14a from sheet 95 leaves pressure-sensitive glue 50 attached to the top side of sheet 14.

Figure 14:
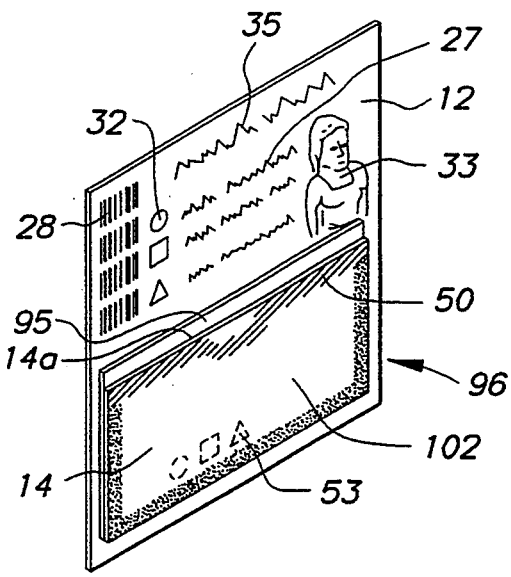
FIG. 14 is a view of the embodiment of FIG. 11 after medications have been put in the pocket and after the pocket has been reclosed.

Apparatus 96 in FIG. 14 is closed after entry of drugs 53 into the pocket 102. Pressure sensitive glue 50 has re-established a semi-permanent bond between sheets 14 and 95 to close pocket 102.

FIG. 15 shows two locations of bonding material 97 on the top and bottom sides of sheet 95 and, this bonding material 95 attaches sheet 95 to sheet 12.

In FIG. 16, there is depicted a document file 97, comprising a commercial frame 72, commercial hanging folders 30, and dispensing envelopes 52. Hanging folder 30a is shown open and carries one dispensing envelope 52 with drugs 53 in its pocket 102. Hanging folder 30b is shown partially open and carries two dispensing envelopes 52. Hanging folder 30c is shown closed and carries one dispensing envelope 52. Index information 28 and 35, printed on the top line of each dispensing envelope 52, shows above the top of each folder 30 to eliminate a need for index tabs or the like attached to folder 30.

FIG. 17 shows a document file 98 comprising a file tray 99 and dispensing envelopes 52. Dispensing envelopes 52 are kept upright and separated into groups 101 by vertical indented slots 100 in the sides of tray 99. Each group 101 is indexed by index information 35 and 28 on the front envelope 52 in that group 101. The indexed dispensing envelopes 52, as used here, eliminates the need for additional index-tab marker sheets in file 98.

The invention has been described by reference to precise embodiments but it will be appreciated by those skilled in the art that this invention is subject to various modifications and to extent that those modifications would be obvious to one of ordinary skill they are considered as being within the scope of the appended claims.

What is claimed is:

1. A dispensing-envelope apparatus having a front side and a rear side and having top and bottom edges relative to gravity, said apparatus comprising, a.) an opaque backing sheet which is adapted to receive printed means from a computer-output printer on said front side of said apparatus, b.) a transparent upward-opening pocket on said front side of said apparatus attached to said backing sheet in an area near said bottom edge;

c.) printed means on said front side of said apparatus in an area near said top edge and above said pocket;

d.) said pocket having, relative to gravity, top, bottom, left, and right sides;

e.) said pocket having a height 30 to 60% of height of said apparatus;

f.) said pocket being permanently attached on said left, right, and bottom sides to said apparatus and providing said upward-opening pocket, relative to gravity, to store small items;

g.) said pocket being semi-permanently attached on said top side of said pocket, said semi-permanent attachment providing a complete closure of said pocket, totally enclosing and sealing a space in said pocket for said small items, said semi-permanent attachment providing means for opening said top side of said pocket to allow entry or removal of said small items into or out of said pocket;

h.) said apparatus having a thickness for facile feeding through a computer-output printer and for receiving said printed means on the said front side of said apparatus in an area located above said pocket;

i.) said printed means being oriented for human readability when said top side of said upward-opening pocket is oriented upward relative to gravity.

2. The dispensing-envelope apparatus in accordance with claim 1 wherein said small items comprise unit drug dosages, or alternatively, bare medication pills.

3. The dispensing-envelope apparatus in accordance with claim 1 wherein said printed means includes two fields comprising computer-output data, a first field including file index data and including the top line of said printed means being located within 0.6 inch of said top edge of said apparatus, and a second field located within 0.6 inch of said top edge of said apparatus, and a second field located below said first field, and comprising patient data, drug data, drug administration orders, and/or other computer-output data.

4. The dispensing-envelope apparatus in accordance with claim 1 wherein said means for opening said top side of said pocket is an indention downward of said semi-permanent attachment along approximately 12% of said top side, said indentation providing a small area between said top side of said pocket and said apparatus where a mechanical means or a human finger may be injected to open said top side of said pocket for reception or removal of said small items.

5. The dispensing-envelope apparatus in accordance with claim 1 wherein said semi-permanently attached top side of said pocket is fixed to said backing sheet by a pressure sensitive adhesive.

6. The dispensing-envelope apparatus in accordance with claim 1 wherein said printed means comprises machine readable data.

7. The dispensing-envelope apparatus in accordance with claim 1 wherein said printed means comprises graphical data.

8. The dispensing-envelope apparatus in accordance with claim 1 wherein said printed means comprises color data.

9. The dispensing-envelope apparatus in accordance with claim 1 wherein said printed means comprises data printed during the manufacture of the envelope.

10. The dispensing-envelope apparatus in accordance with claim 1 wherein said transparent pocket comprises:

a.) a first transparent flexible sheet having top, bottom, left, and right sides; and b.) a second flexible sheet providing a greater height dimension than said first sheet, and providing an equal or greater width dimension than said first sheet;

c.) said opaque backing sheet providing a greater height dimension than said second sheet and an equal or greater width dimension than said second sheet;

d.) said second sheet being permanently attached to said opaque backing sheet, and being located within the lower 60% of the height of said opaque backing sheet, e.) said first sheet being permanently attached to said left, right, and bottom sides to said second sheet for providing said upward opening pocket, said top side of said first sheet being located below the top side of said second sheet;

f.) said semi-permanent attachment of said pocket being located on the said top side of said first sheet between said first sheet and said second sheet, semi-permanently attaching the said top said of said first sheet to said second sheet, said means for opening said top side of said pocket affording separation of said second sheet from first sheet to allow entry or removal of said small items into or out of said pocket.

11. An apparatus comprising:

a.) a first semi-transparent flexible sheet;

b.) a second flexible and opaque backing sheet;

c.) said first sheet being divided into two sections wherein said first section is permanently attached on its four sides and, said second section being permanently bonded on three sides and said fourth side being semi-permanently attachable to said opaque backing sheet such that a pocket is formed which may be opened and closed via said fourth side, d.) said first section having a surface and a plurality of locations for receiving data from an impact printer, e.) whereby various medications can be placed and dispensed from said pocket which corresponds to said data pertinent to a particular patient and said pocket being resealable to allow multiple usage.

* * * * *